United States Patent [19]
Komatsu

[11] Patent Number: 6,037,106
[45] Date of Patent: Mar. 14, 2000

[54] SANDBLASTING PROCESS WITH BLASTABLE PRESSURE SENSITIVE ADHESIVE

[75] Inventor: Toshifumi Komatsu, Duluth, Minn.

[73] Assignee: The Chromaline Corporation, Duluth, Minn.

[21] Appl. No.: 09/344,864

[22] Filed: Jun. 28, 1999

Related U.S. Application Data

[62] Division of application No. 08/910,363, Aug. 13, 1997, which is a division of application No. 08/718,604, Sep. 19, 1996, abandoned, which is a continuation of application No. 07/806,924, Dec. 11, 1991, abandoned.

[51] Int. Cl.$^7$ ........................................................ B24B 1/00
[52] U.S. Cl. ............................. 430/323; 430/320; 451/31
[58] Field of Search .................................... 430/320, 322, 430/323; 451/29, 30, 31

[56] References Cited

U.S. PATENT DOCUMENTS

| | | |
|---|---|---|
| 3,507,740 | 4/1970 | Gasapri . |
| 3,526,064 | 9/1970 | Spidel, Jr. . |
| 3,808,751 | 5/1974 | Usui . |
| 4,146,523 | 3/1979 | Favie . |
| 4,254,209 | 3/1981 | Abe et al. . |
| 4,268,601 | 5/1981 | Namiki et al. . |
| 4,389,480 | 6/1983 | Franke et al. . |
| 4,430,416 | 2/1984 | Goto et al. . |
| 4,456,680 | 6/1984 | Nakamura et al. . |
| 4,587,186 | 5/1986 | Nakamura et al. . |
| 4,618,651 | 10/1986 | Gilch et al. . |
| 4,693,959 | 9/1987 | Ashcraft . |
| 4,716,096 | 12/1987 | Cooper et al. ............................ 430/323 |
| 4,745,140 | 5/1988 | Goswami . |
| 4,756,988 | 7/1988 | Kausch et al. . |
| 4,764,449 | 8/1988 | Van Iseghem . |
| 4,801,490 | 1/1989 | Schuette ................................. 428/211 |
| 4,834,833 | 5/1989 | Palmer . |
| 4,992,500 | 2/1991 | Klauck et al. . |
| 5,370,762 | 12/1994 | Zukowski et al. . |
| 5,525,655 | 6/1996 | Brockington et al. . |

FOREIGN PATENT DOCUMENTS

| | | |
|---|---|---|
| 2409160 | of 0000 | France . |
| 61-36214 | of 0000 | Japan . |

OTHER PUBLICATIONS

Abstract of Bigata, French Patent No. 2,409,160, obtained from the Derwent World Patent Index file on the Dialog computer database.

Abstact of Daicel, Japanese Examined Patent No. 61–36214, obtained from the Derwent World Patent Index file on the Dialog computer database.

Abstract for Sumitomo Chemical, Japanese Patent Application No. 53–99258, obtained from the Derwent World Patent Index file on the Dialog computer database.

Abstract for Asahi Chemical Industries, Japanese Patent Application No. 55–96270, obtained from the Japio file in the Orbit database.

Samuel C. Temi, "Pressure–Sensitive Adhesives for Tapes and Labels", *Handbook of Adhesives*, 641–663 (Irving Skeist ed., 3rd Ed., 1990).

H. B. Fuller Company, Material Safety Data Sheet and Technical Data Sheet for Product No. XR–0882.

*Primary Examiner*—John A. McPherson
*Attorney, Agent, or Firm*—Merchant & Gould P.C.

[57] ABSTRACT

A novel pressure sensitive adhesive (PSA) for use in sandblasting operations to adhere a sandblast mask to a target surface is disclosed. The PSA comprises a non-elastomeric, thermoplastic resin and a tackifier in combination to produce a composition having a $T_g$ of at less than about –40° C. which is both blastable and water redispersible.

15 Claims, No Drawings

SANDBLASTING PROCESS WITH BLASTABLE PRESSURE SENSITIVE ADHESIVE

This application is a Divisional of application Ser. No. 08/910,363, filed Aug. 13, 1997, which is a Divisional of application Ser. No. 08/718,604, filed Sep. 19, 1996, now abandoned, which is a Continuation of Ser. No. 07/806,924, filed Dec. 11, 1991, now abandoned, which application(s) are incorporated herein by reference.

FIELD OF THE INVENTION

This invention relates to a pressure sensitive adhesive for use in sandblasting operations. In particular, the pressure sensitive adhesive is based on a water dispersible, thermoplastic, non-elastomeric resin which is compounded with a tackifier. This novel material exhibits surprising properties useful in the surface decoration of articles using particulate abrasion.

BACKGROUND OF THE INVENTION

Surface treatment by particulate abrasion is an old and valuable process. This is done in primarily two forms: the first involves the application of direct physical pressure on the particulate media and rubbing the media across the target surface, e.g., grinding, sanding, polishing, etc.; and the second generally involves the blasting of the target surface with air-entrained particulate media, e.g., sandblasting, grit blasting, etc.

Sandblasting technology has been used for a number of years to decorate the surface of articles in a predetermined pattern. To achieve this decoration, particulate abrasive media such as steel grit, slag, sand and other forms of silicone oxide, and aluminum oxide are propelled at high velocities against the target surface. In order to control the areas of the target surface which are actually abraded by the blasting media, a patterned mask is applied to the surface. In the past, such masks were prepared manually from rubber, paper, or other material which could withstand penetration by the abrasive media, and they were applied to the target surface using an adhesive, carefully applied to the mask itself. Any adhesive which extended into the void areas of the mask were detrimental, as it often acted as an extension of the mask. This adhesive extension of the mask results in inaccuracies in the etched pattern produced by the sandblasting.

A more recent innovation in sandblasting operations is the use of photoimageable masks or photoresists. These photoresists comprise a photosensitive polymeric material which, upon selective exposure to light of a particular wavelength range, forms regions of two distinct types: those which are removable by a developer liquid and those which are unaffected by the developer. These removable and unremovable regions then form void areas and mask areas after developing. When the photoresists is applied to a target surface, the void areas allow the particulate abrasive media to strike the target surface, while the mask areas protect the underlying target surface from the particulate media.

There have been a number of different approaches to the problem of attaching the photoresist to the target surface. One approach is exemplified by Nakamura et al., U.S. Pat. Nos. 4,456,680 and 4,587,186 wherein the photoresist itself exhibits pressure sensitive adhesive properties. However, this approach requires the use of a liquid photosensitive material and careful preparation of the pressure sensitive adhesive photoresist. This involved preparation of the photoresist requires the user to be rather sophisticated and essentially precludes the use of the technology by small job shops.

Another approach requires the use of a liquid pressure sensitive adhesive forming composition which can be applied to the photoresist mask as a discrete layer. Again, if these pressure sensitive adhesive products are not carefully applied to the photoresist, they can act as a photoresist themselves as discussed above. Therefore, great accuracy is needed in the application of these adhesives to the photoresist to avoid overshoot of the adhesive into the void areas of the photoresist. In order to achieve this accuracy, especially in applications requiring very fine photoresists, time consuming manual application of the adhesive or an expensive adhesive application machine is required.

In addition, there are several products available on the market for general use in graphic arts. These adhesives are useful for application of photoresist masks or general mounting of graphic arts materials and include elastomer based products such as 3M PHOTO MOUNT adhesive, available from 3M Co., and CAMIE 350, available from Camie Campbell, Inc. However, these adhesive compositions also are less than desirable. While, with the proper application weight, these adhesives may be penetrated and removed by the blasting media where exposed by the mask, the adhesives are not water redispersible. Therefore, to remove the sandblasting masks after the blasting operation, hazardous solvents are needed.

In view of the current state of the sandblasting adhesive art, there are a number of failings visible. Therefore, a new pressure sensitive adhesive useful to adhere sandblast masks having very high resolution to target surfaces is needed which is easy to use, versatile, blastable, and water redispersible. Such an adhesive would avoid the need for using great care and accuracy in the application of the adhesive and using hazardous organic solvents to remove the mask after blasting.

SUMMARY OF THE INVENTION

With an eye to overcoming the problems inherent in previous pressure sensitive adhesives used in sandblasting operations, a surprising, new, water redispersible and blastable pressure sensitive adhesive (PSA) composition has been developed. The PSA includes a non-elastomeric, thermoplastic resin and a tackifier. This combination of thermoplastic resin and tackifier forms a composition having a $T_g$ of less than about $-40°$ C. The term "blastable", as used in the specification and the claims, means materials which are essentially immediately removed in sandblasting operations by the impact of particulate abrasive media. In other words, the material does not significantly prevent the particulate media from abrading the target surface. The term "non-elastomeric", as used in the specification and the claims, means materials which do not meet the American Society for Testing and Materials definition of elastomer, "a polymeric material which at room temperature can be stretched to at least twice its original length and upon immediate release of the stress will return quickly to approximately its original length."

The PSA may be formed by the driving of an aqueous mixture having a major portion of water, about 5 to 30 wt-% of a non-elastomeric, thermoplastic resin, and about 1 to 15 wt-% of a tackifier resin. The aqueous mixture may be applied to the target surface prior to the application of the photoresist mask to form a PSA layer on the target surface. The mask is then applied to the PSA layer, and the object is then sandblasted. In addition, the PSA may be applied to a photoresist mask for application to the target surface to form a photoresist mask laminate. Thus, the new PSA can be used to adhere a separate photoresist ask to a target surface, or it can be incorporated in a reformed photoresist mask laminate.

DETAILED DESCRIPTION OF THE PREFERRED EMBODIMENT

Aqueous Adhesive Composition

The aqueous adhesive composition comprises a major proportion of water, about 5 to 30 wt-% of a non-elastomeric, thermoplastic resin, and about 1 to 15 wt-% of a tackifier resin. The aqueous adhesive composition optionally includes an organic solvent, a surfactant, a defoaming agent, and a plasticizer. The aqueous composition can be applied to a surface and dried to form a pressure sensitive adhesive which is both water redispersible and blastable.

The non-elastomeric, thermoplastic resin is the base, film-forming resin of the PSA composition. The thermoplastic resin contributes greatly to the ultimate properties of the PSA composition, and the resin should, therefore, be selected with this in mind. As the PSA is water redispersible, it is important that the thermoplastic base resin itself be water redispersible. The phrase "water redispersible", as used in the specification and the claims, means that the material described is capable of being dispersed and reclaimed by an aqueous solution after being dried to form a pressure sensitive adhesive. This term therefore includes materials which are soluble, emulsifiable, suspendable, as well as dispersible in water and other aqueous solutions.

Thus, a representative, non-limiting list of potential thermoplastic base resins includes polyvinyl alcohol, polyvinyl acetate, vinyl acetate copolymers such as ethylene-vinyl acetate, polyvinyl pyrrolidone, vinyl pyrrolidone copolymers such as vinyl pyrrolidone-vinyl acetate and vinyl pyrrolidone-acrylic acid, and polyurethane. These resins have potential for use in the present invention both individually and in combination with one another. Resins which have a molecular weight in the range of about 10,000 to 400,000 are useful in the novel PSA compositions of the invention. However, when selecting a particular resin and molecular weight thereof, the effect of this selection on the blastability of the PSA should be considered. While not expecting to be held to this theory, it is believed that increased toughness of the base resin tends to decrease the blastability of the resulting compounded PSA.

In addition, the solid phase of the adhesive composition includes a tackifier to increase the tack, adhesion, and cohesion of the PSA. There are a number of generic classes of tackifier including natural rosin, modified rosin, rosin ester, and synthetic hydrocarbon resin tackifiers. Like the base resin, the tackifier is preferably water redispersible, at least in its compounded form in the PSA. The tackifier should be compatible with the base resin in order that the tackifier and base resin form a substantially uniform mixture when applied as a PSA. While not expecting to be held to this theory, it is believed that the tackifier acts to increase the tack of the compounded PSA to glass and to "dilute" the base resin to increase the blastability of the PSA applied to the target surface without significantly reducing tack. Therefore, the tackifier should also be selected for its contributions to the properties of the compounded PSA. Factors to be considered in selecting a tackifier include its chemical structure (e.g., aromatics such as alpha-methyl styrene, aliphatics such as $C_5$ aliphatic resins, and polar tackifiers such as rosin esters), molecular weight (typically between about 200 and 2,000), molecular weight distribution, and compatibility. Because of their generally excellent compatibility with a broad range of film-forming resins, rosin esters are preferred.

Optional components in the aqueous adhesive composition include a surfactant, a defoaming agent, a plasticizer, a stabilizer, and an organic solvent. An effective amount of an ionic or nonionic surfactant such as a carboxylic acid salt, a sulfonic acid salt, a quaternary ammonium salt, a polyoxyethylenated alkyl phenol, or an ethylene oxide-propylene oxide copolymer may be employed to increase the dispersibility of the solid phase within the aqueous phase of the adhesive composition. An effective amount of a defoaming agent such as 2-octanol, a sulfonated oil, an organic phosphate, a silicon fluid, or polydimethylsiloxane may also be helpful to reduce the amount of foam generated during the use of the aqueous adhesive composition. A plasticizing amount of a plasticizer such as a phthalate, a dibenzoate, a phosphate, an adipate, a sorbitol, a glycol, or a glycerin may also be helpful to improve the pressure sensitive adhesive properties of the compounded PSA. However, the use of these plasticizers is balanced against their potential to reduce the blastability and water redispersibility of the PSA. An effective amount of a stabilizer such as a freeze-thaw stabilizer or freezing point depressant, an antioxidant or a UV-stabilizer may also be helpful to stabilize the aqueous composition during numerous freeze-thaw cycles, etc. A minor amount of an organic solvent such as a lower alcohol, a lower hydrocarbon, a lower ketone, or a mixture thereof may also be included to improve the dispersion of the solid phase in the aqueous phase of the adhesive composition. Finally, other optional components such as dyes, pigments, and fillers may be included in the aqueous adhesive composition as desired as long as they do not substantially interfere with the function of the PSA in sandblasting operations.

PSA Film

The aqueous adhesive composition can be applied to a substrate and dried to form PSA film. This dried PSA film is both water redispersible and blastable. The PSA is effective in adequately adhering an imaged and developed photoresist mask to a target surface during processing. This is surprising as high tack, water soluble PSA are generally expected to be very tough and resilient. These properties would not appear to contribute to blastability, etc. However, this PSA film is effective in securing a photoresist mask to a target surface. There are a number of properties which contribute to the usefulness of the PSA film in this application. The PSA film has a $T_g$ of less than about −40° C. This is a measure of the softness, flexibility, film state (continuous or discontinuous), etc. of the polymeric material. If the $T_g$ of the PSA is too high, the PSA will generally be too brittle to be effective, exhibit poor tack, and result in a generally discontinuous film at room temperature; if the $T_g$ is too low, the PSA will generally be too elastomeric to be effectively blastable. In addition to the $T_g$, the relative adhesion of the PSA to the photoresist and target surface and between various layers of a photoresist laminate, and "Sandblast Resistance", a custom test which is described below. These tests help to qualify PSA's for use in adhering photoresist masks to target surfaces for abrasive decorating processes.

Generally, the PSA should provide sufficient adhesive strength between the photoresist mask layer and the target surface to prevent the abrasive decorating process from blasting away portions of the photoresist mask. In addition, when the photoresist mask is a laminate comprising a plurality of layers, some of which are removed after adhering of the laminate to the target surface, the adhesion between the photoresist mask layer and the target surface provided by the PSA should be greater than the adhesion between any release liner and layer of the photoresist laminate which is in contact with the photoresist mask layer. This may be called the "transferability" of the photoresist mask. Thus, the photoresist mask is transferable if a photoresist laminate can be applied to a target surface, the laminate prepared for an abrasive blasting process, and the photoresist mask remains intact as applied on the target surface.

Finally, the Sandblast Resistance test is an effective test which predicts the blastability of the PSA film. As defined above, a blastable material is a material which is essentially immediately removed in a sandblasting operation by the impact of particulate abrasive media. The Sandblast Resistance test proceeds in the following manner:

Blast Resistance Test

Materials Required:
(1) Blasting media (Aluminum Oxide, 160 U.S. Std. Mesh)
(2) Pressurized sandblasting system
    (a) Cabinet
    (b) Airline pressure of 20 psi
    (c) Nozzle (0.25" diameter)
(3) Test Panel Preparation
    (a) Glass plate (approx. 4"×8")
    (b) #12 Mayer Rod
    (c) Coating material (16 wt-% solids)

Procedure:
1. Coat glass test panel with coating material using #12 Mayer rod to obtain about 5.2 g/m² coating on glass panel (dry coating deposit).
2. Air dry test panels.
3. Place coated test panel in sandblast cabinet.
4. Aim sandblast nozzle perpendicular to test panel, maintaining a distance between nozzle and panel of five inches.
5. Activate sandblasting apparatus to blast test panel for five seconds.
6. Repeat steps 4–5 in several different locations on the test panel.
7. Remove test panel from cabinet, removing abrasive media remaining on panel.
8. Remove test coating from test panel using appropriate solvent.
9. Dry test panel in oven and inspect etching in glass panel.
10. Record findings—Yes (etching), No (panel unetched).

Method of use of the Aqueous Adhesive Composition

The aqueous adhesive composition can be prepared by mixing the components in any suitable mixing vessel. It may be helpful to incorporate the solid components as aqueous emulsions into the adhesive composition. Thus, the base resin may be introduced into the adhesive composition as an emulsion of the resin itself or in a compounded form with a plasticizer and/or a tackifier. Preferably, the base resin is introduced as an aqueous emulsion of the resin with a minor amount of plasticizer and tackifier, and additional tackifier may be introduced as an aqueous emulsion. The optional components may be added in any order practical, however, it may be helpful to introduce the defoaming agent into the mixing vessel at an early stage to minimize foam generated during preparation. The aqueous adhesive may be used immediately, or it may be transported and/or stored until use.

The aqueous adhesive composition may be applied to any substrate and dried to form the PSA. The drying of the aqueous composition to preferably monitored to avoid complete drying and the resulting loss of dry tack and other PSA qualities. The aqueous composition is preferably dried sufficiently to substantially eliminate liquid flow of the composition and to provide dry tack. If the PSA is not to be used immediately, a release liner is preferably applied to the exposed surface of the PSA film to avoid overdrying the film. Those of ordinary skill in the art will recognize the appropriate level of drying to provide PSA qualities without overdrying the film.

In one mode of a sandblasting operation, the aqueous adhesive composition can be applied directly to a target surface and dried in place in order to provide a PSA film for the application of the photoresist mask. The PSA may be applied on any target surface which will not be damaged by the aqueous phase of the adhesive composition prior to drying. In particular, it is contemplated that the PSA will be used on target surfaces of glass, metal, wood, ceramic, stone, etc.

The photoresist mask may then be applied directly to the PSA film such that the mask layer itself is adhered to the PSA film on the target surface. Any release liners on the photoresist mask can then be removed to expose the mask for the blasting of the mask and target surface by particulate abrasive media. The photoresist mask may be a mask laminate incorporating a top, destroyable carrier film layer for dimensional stability and protection of the mask layer during use. Again, particulate abrasive media such as steel grit, slag, sand and other forms of silicon oxide, and aluminum oxide can then be propelled at high velocities against the PSA-coated target surface and photoresist mask. The media penetrates and removes the destroyable carrier film, if present, and the PSA film exposed by the void areas of the mask. The blasting continues until a desired abrasion of the target surface is achieved. The target surface and adhered mask may then be treated with an aqueous solution to redisperse the PSA film layer thereby allowing the removal of the photoresist mask. In this manner, very fine abraded patterns may be formed in the target surface.

In a second mode of operation, a photoresist mask laminate comprising a PSA layer may be prepared. Such a mask laminate may be formed of a photoresist mask and the dried PSA material. Preferably, the mask laminate comprises (a) a photoresist mask layer which comprises void areas and mask areas to selectively expose through the void areas an underlying pressure sensitive adhesive composition, (b) the dried PSA material disposed upon the lower surface of the photoresist mask layer, and (c) a destroyable carrier film layer disposed on the upper surface of the photoresist mask layer. Thus, the carrier film layer and the pressure sensitive adhesive composition cooperate to essentially envelope the photoresist mask. More preferably, this mask laminate includes a first release liner on the outside of the destroyable carrier film layer and a second release liner on the outside of the PSA layer. Of course, the mask laminate could have a top and bottom release liner without the destroyable carrier film layer.

In operation, the second release liner is removed from the PSA layer, and the mask laminate is securely adhered to the target surface. Next, the first release liner is removed from the top of the destroyable carrier film layer. The masked target surface is then ready to be blasted as described above. The media penetrates and removes the destroyable carrier film, if present, and the PSA film exposed by the void areas of the mask. The blasting continues until a desired abrasion of the target surface is achieved, and the target and mask are cleaned with an aqueous solution, as described above.

Photoresist masks used in the practice of this invention are generally polymeric photoresists. Preferably, the photoresist mask comprises a photoresist layer as disclosed in Van Iseghem, U.S. Pat. No. 4,764,449, which is hereby incorporated by reference. This photoresist mask layer comprises a negative photosensitive composition which interacts with light of a particular wavelength to transform from a soluble state to an insoluble state. A preferred photoresist composition comprises a cross-linkable polymer composition including a polymer having pendant hydroxyl groups to react with a sufficient concentration of a photoinitiator cross-linking specie. Preferably, the photocross-linkable polymer composition comprises homo- and copolymers of polyvinyl alcohol. Preferred photoinitiator cross-linking species include diazonium salt photocross-linkers. The preferred photoresist composition may also include a water insoluble film-forming polymeric binding agent such as cellulosic compounds, and water insoluble homo- and copolymers made of styrene, methylmethacrylate, vinyl acetate, vinyl butyral, ethylene, propylene, alkylene oxide monomers, and maleic anhydride. Additional components such as plasticizers, surfactants, sensitizers, etc., may also be incorporated into the photoresist mask layer.

The optional destroyable carrier film is preferably easily destroyable by sandblast media so it does not interfere with the ultimate performance of the mask. In addition, the carrier film is preferably non-elastomeric to provide dimensional stability to the laminate. Any polymeric or metallic film may be used as the carrier film if it exhibits the above characteristics. It is preferred that the carrier film be about 1 to 5 microns in thickness. This thickness provides sufficient dimensional stability while not providing too great an impediment to sandblast media. A representative, non-limiting list of useful carrier film materials includes metallic films such as copper and aluminum; polymeric films such as polyvinyl butyral, polyvinyl formal, polyethylene-vinylacetate copolymers, polyolefins, nitrocellulose, polyvinyl chloride; and other materials such as paper.

The photoresist laminate may also include at least one release liner to protect the mask. The release liner should contact the support membrane and photosensitive layer with a surface having low surface energy. This is typically achieved by coating a film with a thin layer of a release agent or release liner such as silicone, electron beam (EB) cured release coating, polytetrafluoroethylene (PTFE), or UV curable release coating. Preferably, the release liner comprises a polyolefin film such as polypropylene, or polyethylene, a polyester film such as polyethylene terephthalate, or MYLAR.

EXAMPLES

The following examples are provided to promote an understanding of the invention and contain a best mode.

EXAMPLE 1

| | | |
|---|---|---|
| 1. | Polyvinylpyrrolidone-based adhesive* | 40.1 |
| 2. | Water | 40.1 |
| 3. | Defoaming agent (BUBBLE BREAKER 3056A Witco Chemical) | 0.3 |
| 4. | Silicone glycol copolymer, HLB value 8.0–11.0; (SILWET L7607, Union Carbide) | 0.5 |
| 5. | Ester Gum tackifier emulsion (NOPCO EB, Henkel Corp.) | 9.0 |
| 6. | Isopropanol | 10.0 |
| | | 100.0 |

Ingredients 1 through 4 were weighed out and mixed together for 5 minutes. Ingredients 5 and 6 were added under agitation to the initial mix. The mixture was allowed to stand at room temperature for approximately 1 hour. The mixture was coated on a sheet of glass (4"×8") by a #12 Mayer rod. The coating was dried in a convection oven for 10 minutes at 120° F.

A piece of pre-imaged sandblast resist mask having a release liner, destroyable carrier film and an imaged and developed photoresist mask layer was applied under hand pressure to the piece of glass. The release liner was removed from the carrier film and photoresist mask without damaging the photoresist mask.

The glass was sandblasted by aluminum oxide (160 U.S. Std. Mesh) by a pressure pot sandblasting unit at 30 psi for about 1 minute. The glass panel was washed with hot water to remove sand, the mask, and the adhesive coating, and dried. The resulting glass panel showed a uniform pattern of etching and no sign of interference with the etching due to the adhesive. The adhesive was blasted very easily and washed away very easily with water.

EXAMPLE 2

| | | |
|---|---|---|
| 1. | The polyvinyl pyrrolidone adhesive of Example 1 | 30.0 |
| 2. | Water | 37.5 |
| 3. | Defoaming agent (FOAM MASTER VT defoamer, Henkel Corp.) | 2.0 |
| 4. | An ethoxylated alkyl phenol surfactant (IGEPAL CO-210, GAF) | 1.0 |
| 5. | Ester Gum tackifier emulsion (NOPCO EB, Henkel Corp.) | 15.0 |
| 6. | Methanol | 14.5 |
| | | 100.0 |

The components are mixed and applied as in Example 1. The glass panel is washed with hot water to remove sand, the mask, and the adhesive coating, and dried. The resulting glass panel shows a uniform pattern of etching and no sign of interference with the etching due to the adhesive. The adhesive is blasted very easily and washed away very easily with water.

EXAMPLE 3

| | | |
|---|---|---|
| 1. | Polyvinyl Acetate homopolymer emulsion, 55% solids in water | 50.0 |
| 2. | Plasticizer (BENZOFLEX 50, Velsicol Chemical) | 27.0 |
| 3. | Defoaming agent (FOAM MASTER VT, Henkel Corp.) | 2.0 |
| 4. | Silicone glycol copolymer, HLB value 8.0–11.0; (SILWET L7607, Union Carbide) | 1.0 |
| 5. | Ester Gum tackifier emulsion (NOPCO EB, Henkel Corp.) | 20.0 |
| | | 100.0 |

The components are mixed and applied as in Example 1. The glass panel is washed with hot water to remove sand, the mask, and the adhesive coating, and dried. The resulting glass panel shows a uniform pattern of etching and no sign of interference with the etching due to the adhesive. The adhesive is blasted very easily and washed away very easily with water.

EXAMPLE 4

| 1. | Polyvinyl Alcohol, degree of Hydrolysis = 71–89, Low MW grade, 25% solution | 50.0 |
|---|---|---|
| 2. | Glycerol | 20.0 |
| 3. | Polyvinyl Acetate homopolymer emulsion, 55 wt-% solids | 10.0 |
| 4. | Dibutyl Phthalate Plasticizer | 2.5 |
| 5. | Ester Gum tackifier emulsion (NOPCO EB, Henkel Corp.) | 10.0 |
| 6. | Defoaming agent (BUBBLE BREAKER 3056A Witco Chemical) | 2.0 |
| 7. | Silicone glycol copolymer, HLB value 8.0–11.0; (SILWET L7607, Union Carbide) | 1.0 |
| 8. | Isopropanol | 4.5 |
|   |   | 100.0 |

The components are mixed and applied as in Example 1. The glass panel is washed with hot water to remove sand, the mask, and the adhesive coating, and dried. The resulting glass panel shows a uniform pattern of etching and no sign of interference with the etching due to the adhesive. The adhesive is blasted very easily and washed away very easily with water.

EXAMPLE 5

| 1. | Vinylpyrrolidone/vinyl acetate copolymer, agueous dispersion, 25% solids; MW = 40,000 to 160,000; Vinylpyrrolidone/vinyl acetate ratio = 70/30 to 30/70 | 30.0 |
|---|---|---|
| 2. | Partially hydrolyzed PVA, degree of Hydrolysis = 71–89, Low MW grade, 25% solution | 40.0 |
| 3. | Defoaming agent (FOAM MASTER VT, Henkel Corp.) | 2.0 |
| 4. | An ethoxylated alkyl phenol surfactant (IGEPAL CO-210, GAF) | 5.0 |
| 5. | Ester Gun tackifier emulsion (NOPCO EB, Henkel Corp.) | 10.0 |
| 6. | Glycerol | 4.0 |
| 7. | Isopropanol | 9.0 |
|   |   | 100.0 |

The components are mixed and applied as in Example 1. The glass panel is washed with hot water to remove sand, the mask, and the adhesive coating, and dried. The resulting glass panel shows a uniform pattern of etching and no sign of interference with the etching due to the adhesive. The adhesive is blasted very easily and washed away very easily with water.

Example 6

The adhesive of Example 1 was coated over an imaged and developed photoresist mask layer using a #12 Mayer rod of a laminate having the mask layer, a destroyable carrier layer of polyvinyl butyral, and a release liner. The resulting photoresist mask laminate was dried for about 3 minutes at 120° F. The photoresist mask laminate was adhered with hand pressure, rolling the laminate onto a spherical glass jar. The release liner was removed from the laminate, and the remaining laminate remained well-adhered to the jar. The glass jar was sandblasted as in Example 1. The jar was then washed with hot water to remove the blasting media, photoresist mask, and the adhesive and subsequently dried in an oven. The etched pattern in the jar was very uniform, and it did not show any evidence of interference with the pattern from the adhesive layer. The adhesive exposed through the mask was blasted away very easily.

Example 7

Several PSA's of various classifications were subjected to the Sandblast Resistance Test described above. In addition, the adhesives were tested for water redispersibility by rinsing with hot water (about 50° C.) for about two minutes. The results are illustrated below in Table I.

TABLE I

| PSA Type | Blastability | Redispersibility |
|---|---|---|
| Acrylate (Ashland Chemical 2302-W-60) | Yes | No |
| Acrylate (Rohm & Haas ROBOND PS-61) | Yes | No |
| Elastomeric (CAMIE 350)* | No | No |
| The polyvinylpyrrolidone adhesive of Example 1 (ingredient 1.) | Yes | Yes |
| Example 1 | Yes | Yes |

From the above data, it can be seen that the elastomeric PSA is not blastable. In addition, the elastomeric PSA and the acrylate PSA's were not water redispersible. The only Blastable and redispersible PSA's were the polyvinylpyrrolidone based materials. However, only the PSA of Example 1 exhibits transferability wherein the photoresist mask is not blasted off of the target surface during a sandblasting operation.

Although the present invention has been described with reference to the above particular discussion and examples, it should be understood that those skilled in the art may make many other modifications without departing from the spirit and scope of the invention as defined by the appended claims.

What is claimed is:

1. A process for decorating a target surface by forming a patterned abraded design in the surface, which process comprises the steps of:
   (a) applying to the target surface a pressure sensitive adhesive composition which comprises:
      (i) a major portion of water;
      (ii) about 5 to 30 wt-% of a non-elastomeric, thermoplastic resin; and
      (iii) about 1 to 15 wt-% of a rosin ester tackifier;
   wherein the adhesive composition dries to form a water redispersible and blastable pressure sensitive adhesive film having a $T_g$ of less than about −40° C.;
   (b) adhering an imaged and developed photoresist mask to the pressure sensitive adhesive film on the surface opposite the target surface wherein the photoresist mask comprises void areas and mask areas to selectively expose through the void areas the underlying pressure sensitive adhesive film;
   (c) delivering particulate abrasive media high velocities to and through the exposed portions of the pressure sensitive adhesive film to selectively expose the target surface;
   (d) delivering particulate abrasive media at high velocities to the exposed portions of the target surface to form a patterned, abraded design therein;

and (e) redispersing the pressure sensitive adhesive film in an aqueous solution, thereby removing the photoresist mask from the target surface;

wherein the adhesive film provides adhesion between the imaged and developed photoresist mask layer and the target surface sufficient to prevent undesired removal of the photoresist mask layer prior to redispersing the pressure sensitive adhesive film in the aqueous solution.

2. The process of claim 1 wherein the non-elastomeric thermoplastic resin is a polyvinyl alcohol, a polyvinyl acetate, a polyurethane, or a mixture thereof.

3. The process of claim 1 wherein the non-elastomeric thermoplastic resin is a vinylpyrrolidone homo- or copolymer.

4. The process of claim 1 wherein the non-elastomeric thermoplastic resin is a copolymer of a polyvinyl acetate, or a polyvinyl alcohol.

5. The process of claim 1 wherein the tackifier resin is a natural rosin, a modified rosin, a hydrocarbon resin, or a mixture thereof.

6. The process of claim 1 wherein the tackifier resin is a rosin ester.

7. The process of claim 1 wherein the particulate abrasive media comprises aluminum oxide or silicone oxide.

8. A process for decorating a target surface by forming a patterned abraded design in the surface, which process comprises the steps of:

(a) applying to the target surface a sandblast mask laminate which comprises:

(i) an imaged and developed photoresist mask layer having an upper surface and a lower surface wherein the photoresist mask layer comprises void areas and mask areas to selectively expose through the void areas an underlying pressure sensitive adhesive composition;

(ii) a pressure sensitive adhesive composition having a $T_g$ of less than about $-40°$ C. disposed upon the lower surface of the photoresist mask layer which comprises:

(A) about 50 to 99 wt-% of a non-elastomeric, thermoplastic resin; and (B) about 1 to 50 wt-% of a tackifier;

(iii) a destroyable carrier film layer disposed on the upper surface of the photoresist mask layer wherein the carrier film layer and the pressure sensitive adhesive composition cooperate to essentially envelope the photoresist mask layer; and (iv) a release liner in contact with the surface of the destroyable carrier film layer opposite the photoresist mask layer;

wherein the pressure sensitive adhesive composition is water redispersible and blastable and the laminate is applied to the target surface by adhering the pressure sensitive adhesive composition to the target surface;

(b) delivering particulate abrasive media at high velocities to and through destroyable carrier film layer to expose photoresist mask layer and the pressure sensitive adhesive film;

(c) delivering particulate abrasive media at high velocities to and through the exposed portions of the pressure sensitive adhesive film to selectively expose the target surface;

(d) delivering particulate abrasive media at high velocities to the exposed portions of the target surface to form a patterned, abraded design therein; and (e) redispersing the pressure sensitive adhesive film in an aqueous solution, thereby removing the photoresist mask from the target surface;

wherein the adhesive film provides adhesion between the imaged and developed photoresist mask layer and the target surface sufficient to prevent undesired removal of the photoresist mask layer prior to redispersing the pressure sensitive adhesive film in the aqueous solution.

9. The process of claim 8 wherein the non-elastomeric thermoplastic resin is a polyvinyl alcohol, a polyvinyl acetate, a polyurethane, or a mixture thereof.

10. The process of claim 8 wherein the non-elastomeric thermoplastic resin is a vinylpyrrolidone homo- or copolymer.

11. The process of claim 8 wherein the non-elastomeric thermoplastic resin is a copolymer of a polyvinyl acetate, or a polyvinyl alcohol.

12. The process of claim 8 wherein the tackifier resin is a natural rosin, a modified rosin, a hydrocarbon resin, or a mixture thereof.

13. The process of claim 8 wherein the tackifier resin is a rosin ester.

14. The process of claim 8 wherein the particulate abrasive media comprises aluminum oxide or silicone oxide.

15. A process for decorating a target surface by forming a patterned abraded design in the surface, which process comprises the steps of:

(a) imaging and developing a photosensitive laminate comprising:

(i) a photoresist mask layer having an upper surface and a lower surface comprising a water soluble vinyl polymer having pendant hydroxyl groups capable of photogenerated insolubility which layer is developable with aqueous media to form mask areas and void areas;

(ii) a destroyable carrier film layer disposed on the upper surface of the photoresist mask layer; and (iii) a release liner in contact with the surface of the destroyable carrier film layer opposite the photoresist mask layer;

(b) applying to the target surface an aqueous adhesive composition which comprises:

(i) a major portion of water;

(ii) about 5 to 30 wt-% of a non-elastomeric, thermoplastic resin; and (iii) about 1 to 15 wt-% of a rosin ester tackifier;

wherein the adhesive composition dries to form a water redispersible and blastable pressure sensitive adhesive film having a $T_g$ of less than about $-40°$ C.;

(c) adhering to the pressure sensitive adhesive film on the surface opposite the target surface the imaged and developed photoresist mask layer of the photoresist laminate wherein the void areas of the photoresist mask layer selectively expose the underlying pressure sensitive adhesive layer;

(d) separating the release liner from the destroyable carrier film layer;

(e) delivering particulate abrasive media at high velocities to and through destroyable carrier film layer to expose photoresist mask layer and the pressure sensitive adhesive film;

(f) delivering particulate abrasive media high velocities to and through the exposed portions of the pressure sensitive adhesive film to selectively expose the target surface;

(g) delivering particulate abrasive media at high velocities to the exposed portions of the target surface to form a patterned, abraded design therein; and (h) redispersing the pressure sensitive adhesive film in an aqueous solution, thereby removing the photoresist mask from the target surface;

wherein the adhesive film provides adhesion between the imaged and developed photoresist mask layer and the target surface sufficient to prevent undesired removal of the photoresist mask later prior to redispersing the pressure sensitive adhesive film in the aqueous solution.

* * * * *